United States Patent
Kimura

(10) Patent No.: US 9,102,368 B2
(45) Date of Patent: Aug. 11, 2015

(54) FLUID CONTROL APPARATUS

(71) Applicant: Yukihide Kimura, Gotenba (JP)

(72) Inventor: Yukihide Kimura, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/363,548

(22) PCT Filed: Dec. 5, 2012

(86) PCT No.: PCT/IB2012/002592
§ 371 (c)(1),
(2) Date: Jun. 6, 2014

(87) PCT Pub. No.: WO2013/084047
PCT Pub. Date: Jun. 13, 2013

(65) Prior Publication Data
US 2014/0361578 A1      Dec. 11, 2014

(30) Foreign Application Priority Data

Dec. 9, 2011 (JP) .................. 2011-270226

(51) Int. Cl.
*B62D 35/00* (2006.01)
*B62D 35/02* (2006.01)

(52) U.S. Cl.
CPC .................... *B62D 35/02* (2013.01)

(58) Field of Classification Search
CPC ......... B62D 35/02; B62D 37/00; B62D 37/02
See application file for complete search history.

(56) References Cited

U.S. PATENT DOCUMENTS

| 4,772,062 A | 9/1988 | Janssen et al. |
| 6,179,077 B1 * | 1/2001 | Burdges et al. ............. 180/68.4 |
| 2005/0051372 A1 | 3/2005 | Guertler |
| 2009/0146453 A1 * | 6/2009 | Ortega et al. ............. 296/180.4 |
| 2011/0272964 A1 * | 11/2011 | Henderson et al. ........ 296/180.4 |

FOREIGN PATENT DOCUMENTS

| DE | 29721562 U1 | 2/1998 |
| DE | 102008060257 A1 | 6/2010 |
| EP | 0257341 A2 | 3/1988 |
| EP | 0420826 A1 | 4/1991 |
| EP | 1514772 A1 | 3/2005 |
| JP | 10-281115 | 10/1998 |
| JP | 2009-504472 A | 2/2009 |
| WO | 2007/017236 A1 | 2/2007 |

* cited by examiner

*Primary Examiner* — Lori L Lyjak
(74) *Attorney, Agent, or Firm* — Kenyon & Kenyon LLP

(57) ABSTRACT

A fluid control apparatus includes a plate member that separates an air stream on a surface of a body of a moving body into a boundary layer and a main flow and a blow-out portion that blows out the boundary layer separated by the plate member into the main flow separated by the plate member in a downstream of the plate member in a flow direction of an air stream.

6 Claims, 4 Drawing Sheets

FLUID CONTROL APPARATUS

CROSS-REFERENCE TO RELATED APPLICATIONS

This is a national phase application based on the PCT International Patent Application No. PCT/IB2012/002592 filed on Dec. 5, 2012, claiming priority to Japanese application No. 2011-270226 filed Dec. 9, 2011, the entire contents of both of which are incorporated herein by reference.

BACKGROUND OF THE INVENTION

1. Field of the Invention

The present invention relates to a fluid control apparatus.

2. Description of Related Art

There has been a technology of enhancing stability of a vehicle body by increasing negative lift (down force). It is known that the negative lift is increased by increasing the speed of air flowing under the vehicle body. However, a layer referred to as "boundary layer" which is formed around a surface of the vehicle body and in which the flow speed of fluid is low decreases the speed of air flowing under the vehicle body and consequently decreases negative lift. Accordingly, a boundary layer suction system disclosed in Published Japanese Translation of PCT application No. 2009-504472 (JP-A-2009-504472) described below secures negative lift by suction of the boundary layer around a floor surface.

However, the boundary layer suction system disclosed in above JP-A-2009-504472 may suction the boundary layer to some extent and thereby reduce the ratio of the boundary layer; however, it cannot surely separate the boundary layer of an air stream from a main flow of the air stream on the surface of the vehicle body. Further, the main flow of the air stream reattaches to the surface of the vehicle body, and a part of the main flow may thereby change into the boundary layer. Therefore, the main flow is decelerated by the boundary layer, negative lift decreases, and the stability of the vehicle body may thus be impaired. The system becomes large in size in order to completely suction such a boundary layer. Therefore, the system cannot be installed in the vehicle.

SUMMARY OF THE INVENTION

Accordingly, the present invention has been made in consideration of such a circumstance, and an object of the present invention is to provide a fluid control apparatus that can prevent deceleration of a main flow of an air stream on a surface of a body of a moving body.

An aspect of the present invention provides a fluid control apparatus including: a plate member that separates an air stream on a surface of a body of a moving body into a boundary layer and a main flow; and a blow-out portion that blows out the boundary layer separated by the plate member into the main flow separated from the boundary layer by the plate member in a downstream of the plate member in a flow direction of the air stream.

In the fluid control apparatus, on the surface of the body of the moving body, deceleration of the main flow of the air stream can be prevented, thus enabling reduction in resistance due to the air stream. For example, on a lower surface of a vehicle, reduction in down force can be prevented.

Further, in the fluid control apparatus in accordance with the aspect of the present invention, the plate member may be provided at a certain interval from the surface of the body. In such a case, the plate member provided on the surface of the body can mechanically separate the boundary layer and the main flow of the air stream on the surface of the body from each other.

Further, the fluid control apparatus in accordance with the aspect of the present invention may further include a guide portion that changes a flow direction of the separated boundary layer. The blow-out portion may blow out the boundary layer whose flow direction is changed by the guide portion into the separated main flow. Moreover, the guide portion may change the flow direction of the separated boundary layer into a direction separating from the surface of the body. In such a case, a simple configuration in which only the guide portion is provided allows prevention of reattachment of the separated main flow to the body.

Further, the fluid control apparatus in accordance with the aspect of the present invention may further include a compression portion that compresses the separated boundary layer. The blow-out portion may blow out the boundary layer compressed by the compression portion into the separated main flow. In such a case, the boundary layer is compressed, the fluid velocity of the blown out boundary layer can thereby be increased, and reattachment of the separated main flow to the body can further be prevented.

According to the aspect of the present invention, deceleration of the main flow of the air stream can be prevented on the surface of the body of the moving body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of a fluid control apparatus in accordance with the present invention will be described hereinafter in detail with reference to drawings. In the descriptions of the drawings, the same or corresponding parts are denoted by the same numerals and symbols, and duplicating descriptions will be omitted.

Figure 1:
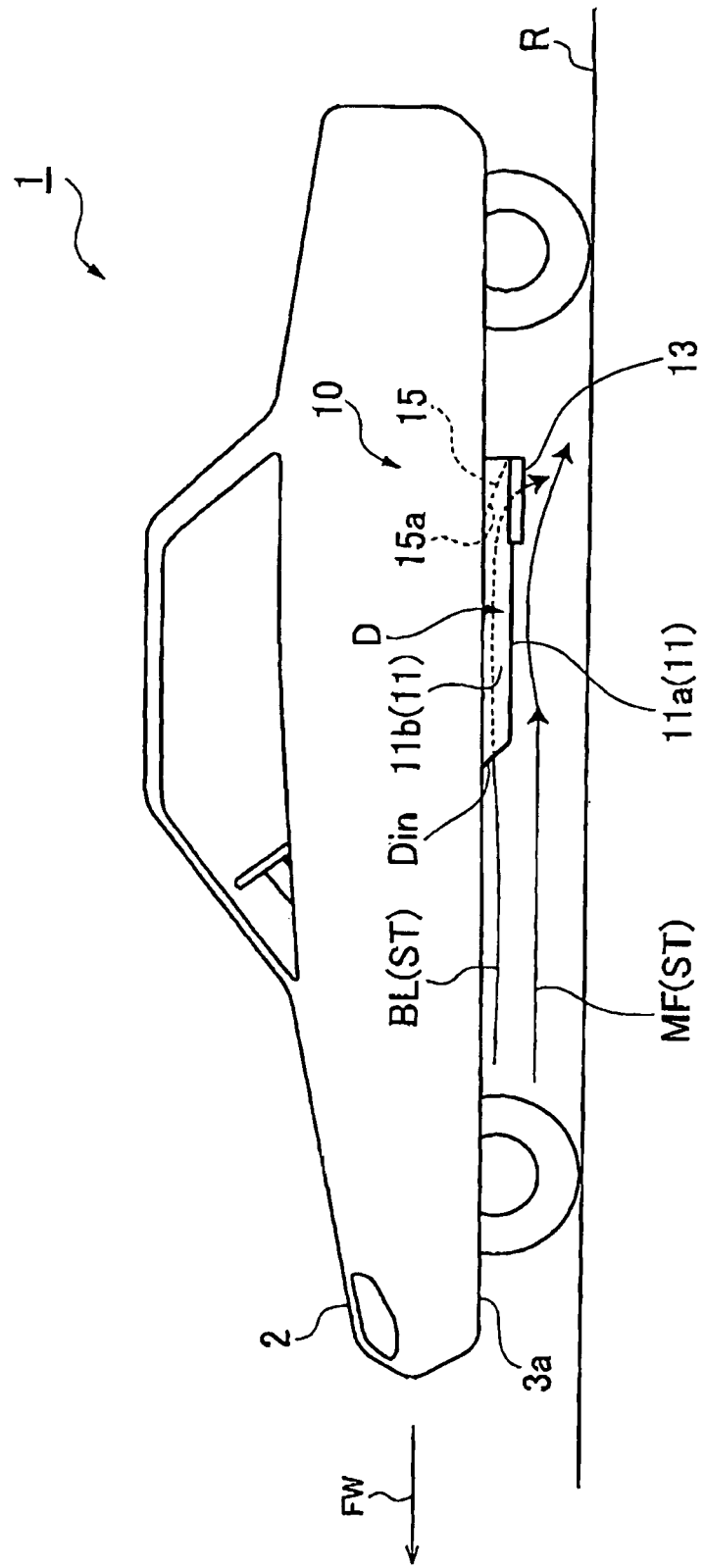
FIG. 1 is a schematic block diagram of a moving body in which a fluid control apparatus in accordance with a first embodiment is installed.

FIG. 1 is a schematic configuration diagram of a moving body in which a fluid control apparatus in accordance with a first embodiment of the present invention is installed. As shown in FIG. 1, the fluid control apparatus 10 is an apparatus installed in a moving body 1. The fluid control apparatus 10 is an apparatus for separating an air stream ST generated around the moving body 1 due to movement of the moving body 1 into a main flow MF (simply referred to as "main flow MF" hereinafter) of the air stream ST and a boundary layer BL (simply referred to as "boundary layer BL" hereinafter) of the air stream ST. Here, the main flow MF is an air flow contained in the air stream ST, which has a uniform flow velocity at approximately the same speed as the moving speed of the moving body 1. Further, the boundary layer BL is an air flow contained in the air stream ST, which is formed around a surface of the moving body 1 and has a lower flow velocity than the main flow MF.

The fluid control apparatus 10 is provided on a lower surface 3*a* (surface) of a body 2 of the moving body 1 such as a vehicle. Further, the fluid control apparatus 10 includes a boundary layer separation portion 11 and a blow-out portion 13. In the descriptions made hereinafter, up and down, front and rear, and left and right of the fluid control apparatus 10 represent the directions in the case that the body 2 side is up, a road surface R side is down, a traveling direction FW side is front, and the opposite side to the traveling direction FW is rear. Further, the flow velocities of the main flow MF and the boundary layer BL represent the relative speeds to the moving body 1.

The boundary layer separation portion 11 has a structure for separating the air stream ST into the boundary layer BL and the main flow MF. Specifically, the boundary layer separation portion 11 includes a boundary layer separation plate 11*a* and a pair of support members 11*b*, for example. The boundary layer separation plate 11*a* is a plate member for separating the air stream ST into the boundary layer BL and the main flow MF and is provided at a prescribed interval from the lower surface 3*a*, for example, such that the boundary layer separation plate 11*a* is positioned around the boundary between the boundary layer BL and the main flow MF of the air stream ST on the lower surface 3*a*. Further, the boundary layer separation plate 11*a* is provided in parallel with the lower surface 3*a*. The boundary layer separation plate 11*a* has approximately the same width as the width of the lower surface 3*a* in the left-right direction, for example. In addition, the boundary layer separation plate 11*a* is a plate member extending in the fore-to-aft direction of the fluid control apparatus 10. Further, the boundary layer separation plate 11*a* has the length corresponding to the distance in which the main flow MF separated at a front edge of the boundary layer separation plate 11*a* reattaches to the lower surface 3*a* (or the boundary layer separation plate 11*a*) of the body 2. Here, being in parallel with the lower surface 3*a* includes being generally in parallel therewith to the extent that boundary layer separation plate 11*a* can mechanically separate the boundary layer BL from the main flow MF and is almost not subject to the resistance due to the air stream ST.

The support members 11*b*, 11*b* are members for mounting the boundary layer separation plate 11*a* on the lower surface 3*a*. The support members 11*b*, 11*b* connect both ends of the boundary layer separation plate 11*a* in the left-right direction and the lower surface 3*a* together along the fore-to-aft direction of the boundary layer separation plate 11*a*. The boundary layer separation plate 11*a*, the support members 11*b*, 11*b*, and the lower surface 3*a* form a duct D. A front end of the boundary layer separation plate 11*a*, front ends of the support members 11*b*, 11*b*, and the lower surface 3*a* form an opening Din which opens forward in the fluid control apparatus 10. The opening Din is a suction opening for suctioning the boundary layer BL separated by the boundary layer separation plate 11*a*. The duct D is a conduit for carrying the boundary layer BL separated by the boundary layer separation plate 11*a* to the blow-out portion 13.

The blow-out portion 13 is a portion for blowing out the boundary layer BL separated by the boundary layer separation portion 11 into the main flow MF separated by the boundary layer separation portion 11 in the rear of the boundary layer separation portion 11. The blow-out portion 13 is provided rearward at a rear end of the boundary layer separation plate 11*a* in parallel with the boundary layer separation plate 11*a*, for example. Further, the blow-out portion 13 has approximately the same width as that of the boundary layer separation plate 11*a*. Moreover, a plurality of blow-out holes are formed in the blow-out portion 13. The boundary layer BL which has passed through the duct D is blown out from the lower surface 3*a* toward the road surface R via the blow-out holes. Here, the main flow MF has a property of reattaching to the body (the lower surface 3*a*) in the downstream of the boundary layer separation plate 11*a*. Therefore, the blow-out portion 13 blows out the boundary layer BL separated by the boundary layer separation portion 11, for example, around a position in which the main flow MF separated by the boundary layer separation portion 11 starts reattaching to the lower surface 3*a* or the boundary layer separation plate 11*a*.

The fluid control apparatus 10 may further include a guide portion 15. The guide portion 15 is a plate member for changing the flow direction of the boundary layer BL separated by the boundary layer separation portion 11. The guide portion 15 is provided at a rear end of the duct D. Further, the guide portion 15 has a guide surface 15*a* positioned above the blow-out portion 13. The guide surface 15*a* is a surface inclined with respect to the traveling direction FW of the moving body 1 in the vehicle side view. Specifically, the guide surface 15*a* inclines rearward as separating downward from the lower surface 3*a*. Further, the guide surface 15*a* is provided between the lower surface 3*a* and a rear end of the blow-out portion 13. The flow direction of the boundary layer BL which has passed through the duct D is changed by the guide portion 15, and the boundary layer BL flows to the rear of the fluid control apparatus 10 from the lower surface 3*a* toward the road surface R.

The air stream around the moving body 1 including the fluid control apparatus 10 configured in such a manner will be described. The moving body 1 moves in the traveling direction FW, and the air stream ST in which the main flow MF and the boundary layer BL are integrally connected is thereby generated from the front toward the rear of the moving body 1. The air stream ST is mechanically separated into the main flow MF and the boundary layer BL by the front edge of the boundary layer separation plate 11*a* of the boundary layer separation portion 11. In this process, the separated boundary layer BL flows into the duct D formed with the boundary layer separation plate 11*a*, the support members 11*b*, and the lower surface 3*a* through the opening Din and flows rearward through the duct D.

Further, the flow direction of the boundary layer BL flowing through the duct D is changed into a direction separating from the lower surface 3*a* by the guide portion 15. On the other hand, the separated main flow MF flows rearward from the front edge of the boundary layer separation plate 11*a*. The main flow MF starts reattaching to the boundary layer separation plate 11*a* as progressing rearward of the boundary layer separation plate 11*a*. The boundary layer BL with the changed flow direction is blown out into the separated main flow MF from the blow-out portion 13 around the position in which the main flow MF starts reattaching to the boundary layer separation plate 11*a*. This changes the flow direction of the main flow MF into the direction separating from the lower surface 3*a*.

Figure 2:
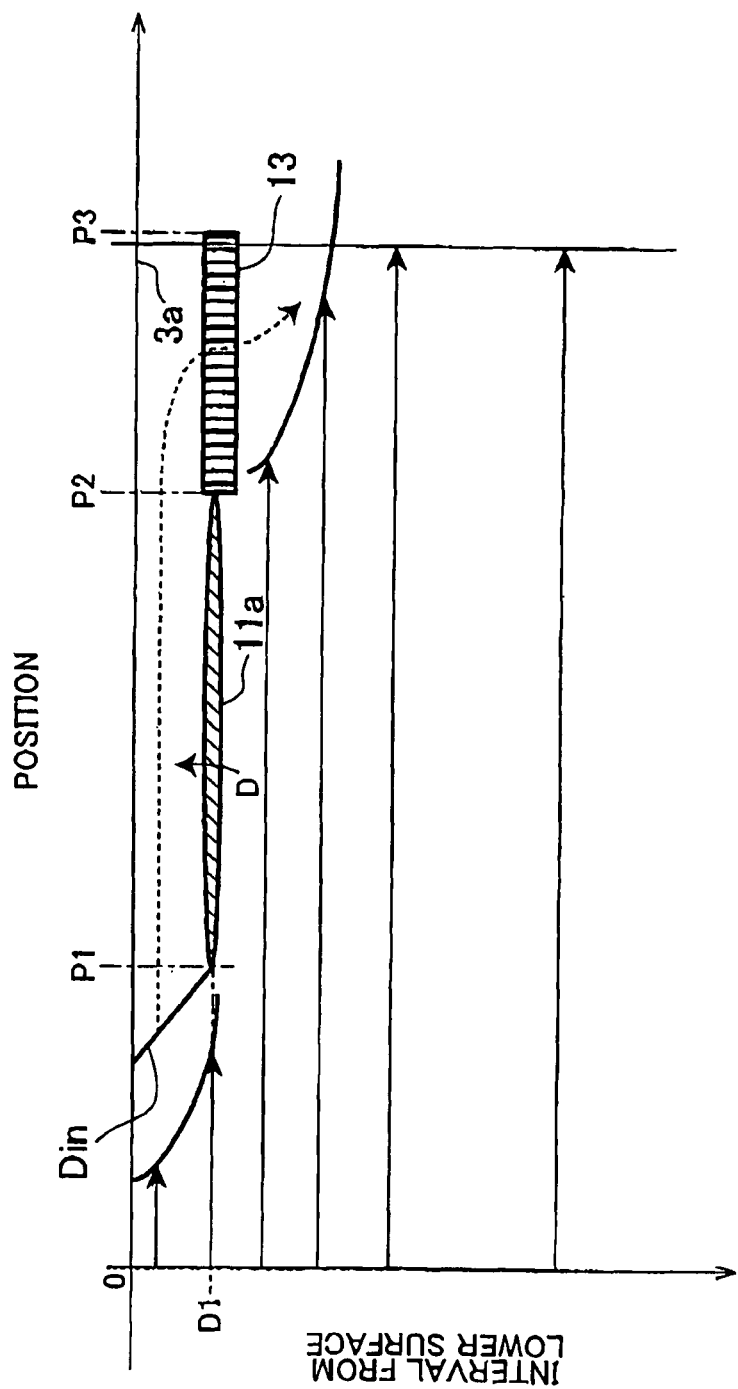
FIG. 2 illustrates an air stream under a body of FIG. 1.
Figure 3:
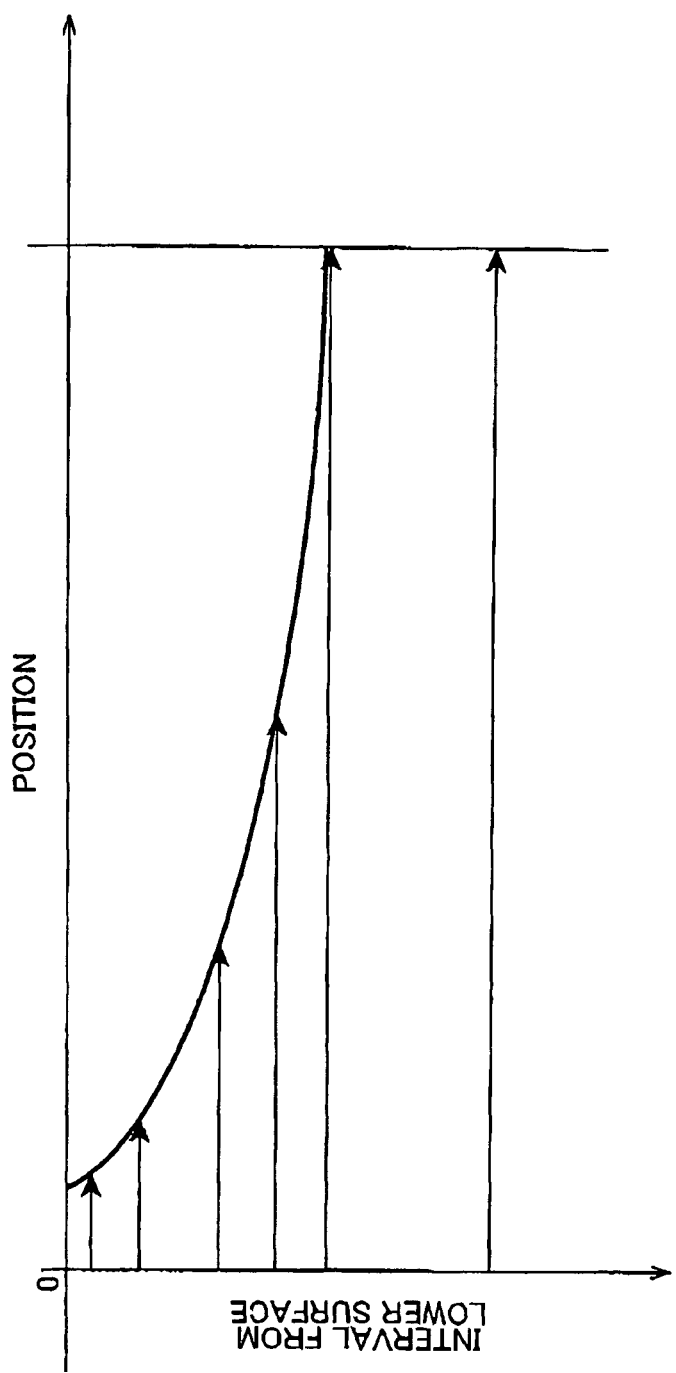
FIG. 3 illustrates an air stream under the body of a comparative example.

Next, function and effect of the fluid control apparatus 10 will be described with reference to FIGS. 2 and 3. FIG. 2 is related with the moving body 1 in which the fluid control apparatus 10 is installed. Specifically, FIG. 2 illustrates the air stream under the lower surface 3*a* of the body 2. FIG. 3 is related with a moving body in which no fluid control apparatus 10 is installed. Specifically, FIG. 3 illustrates an air stream under a lower surface of a body. In FIGS. 2 and 3, the horizontal axis represents the position of the moving body 1 in the fore-to-aft direction in the case that a front end of the lower surface is set as zero. The vertical axis represents the downward distance from the lower surface in the case that the height of the lower surface is set as zero. Further, each arrow (solid line) represents the magnitude of the fluid velocity at the concerned height, and the curves connecting the tips of the arrows together represent states of the fluid velocities.

As shown in FIG. 3, in the moving body in the related art, in which no fluid control apparatus 10 is installed, the air stream under a lower surface of the moving body has the boundary layer formed around the lower surface and the main flow formed in a position at a certain interval or longer away from the lower surface integrally connected together. The boundary layer drags around the moving body due to the viscosity of the fluid and thus has a lower fluid velocity. Further, the boundary layer is less subject to the viscosity as separating from the lower surface, and its fluid velocity increases. On the other hand, the main flow is scarcely influenced by the viscosity. Accordingly, a fluid velocity of the main flow is generally the same as the moving speed of the moving body. However, in the moving body in the related art, the boundary layer and the main flow are not certainly separated from each other. Therefore, the main flow more easily reattach (also referred to as "merging" or "mixing") to the boundary layer as progressing rearward, and the main flow is thereby decelerated by the boundary layer. As described above, when the main flow is decelerated by the boundary layer, the negative lift decreases. Therefore, the stability of the moving body may be impaired.

Further, in the moving body in the related art, the boundary layer and the main flow are integrally connected together. Accordingly, only suctioning the boundary layer does not certainly separate the boundary layer and the main flow from each other, and the main flow is subject to the influence of the viscosity. In addition, the air stream has a property of reattachment, and the main flow reattaches to the body (the lower surface) and then changes into the boundary layer. Accordingly, in order to sufficiently suction the boundary layer, a suction portion in a wide area or a long dimension is necessary.

On the other hand, as shown in FIG. 2, in the moving body 1 in which the fluid control apparatus 10 is installed, the air stream ST under the lower surface 3a is the same as the conventional moving body from the front end to a point P1. In other words, the boundary layer BL formed around the lower surface 3a and the main flow MF formed in a position away from the lower surface 3a at an interval D1 or longer are integrally formed together. However, in the moving body 1, from the position P1 to a position P2 in the fore-to-aft direction, the boundary layer separation plate 11a is provided in a position at the interval D1 provided downward from the lower surface 3a. Accordingly, the air stream under the lower surface 3a is mechanically separated into the boundary layer BL on the lower surface 3a side and the main flow MF on the road surface R side by the boundary layer separation plate 11a. Therefore, in the rear of the position P1, the main flow MF is not decelerated by the boundary layer BL. In other words, the boundary layer of the air stream and the main flow of the air stream on the surface of the body of the moving body are separated each other by the boundary layer separation plate, thereby preventing deceleration of the main flow of the air stream due to the boundary layer of the air stream.

However, an air stream has a property of reattachment. Therefore, the main flow MF separated by the boundary layer separation plate 11a tends to reattach to the boundary layer separation plate 11a around the position P2, and the fluid velocity of the main flow MF thereby starts decelerating.

Accordingly, in the moving body 1, the blow-out portion 13 is provided from the position P2 to a position P3 in the fore-to-aft direction. The boundary layer BL separated by the boundary layer separation plate 11a is blown out from the blow-out portion 13 into the main flow MF separated by the boundary layer separation plate 11a. In this process, the boundary layer BL is blown out from the lower surface 3a toward the road surface R, and the flow direction of the main flow MF can thereby be changed into the direction departing from the lower surface 3a. Accordingly, the main flow MF can be prevented from reattaching to the boundary layer separation plate 11a and the lower surface 3a. In other words, the separated boundary layer is blown out into the separated main flow, the separated main flow can thereby be prevented from reattaching to the body, and the separated main flow can also be prevented from changing into the boundary layer. As a result, the deceleration of the main flow MF can be prevented also in the rear of the position P2. Therefore, the fluid velocity of the main flow MF is maintained approximately the same as the moving speed of the moving body 1 to a rear end of the lower surface 3a.

Further, the fluid control apparatus 10 includes the guide portion 15 above the blow-out portion 13. The flow direction of the boundary layer BL separated by the boundary layer separation plate 11a is changed by the guide portion 15, and the boundary layer BL flows from the lower surface 3a toward the road surface R. The boundary layer BL whose flow direction has been changed by the guide portion 15 is blown out into the main flow MF via the blow-out portion 13. Accordingly, the main flow MF can be prevented from reattaching to the boundary layer separation plate 11a and the lower surface 3a. In other words, the flow direction of the boundary layer BL separated by the boundary layer separation plate 11a is changed by the guide portion 15 into a direction in which the main flow MF is prevented from reattaching to the boundary layer separation plate 11a and the lower surface 3a. The boundary layer BL is then blown out into the main flow MF via the blow-out portion 13. Accordingly, a simple configuration in which only the guide portion 15 is provided prevents reattachment of the main flow MF.

As described above, the fluid control apparatus 10 separates the main flow MF and the boundary layer BL from each other in a wide range of the front end to the rear end of the lower surface 3a. This reduces the ratio of the main flow MF that decelerates due to dragging to the boundary layer BL. As a result, under the lower surface 3a, the reduction in the negative lift can be prevented, thereby enabling an improvement in the stability of the moving body 1. For example, vibration on the moving body 1 due to unevenness of the road surface R and roll during rapid steering can be reduced.

Figure 4:
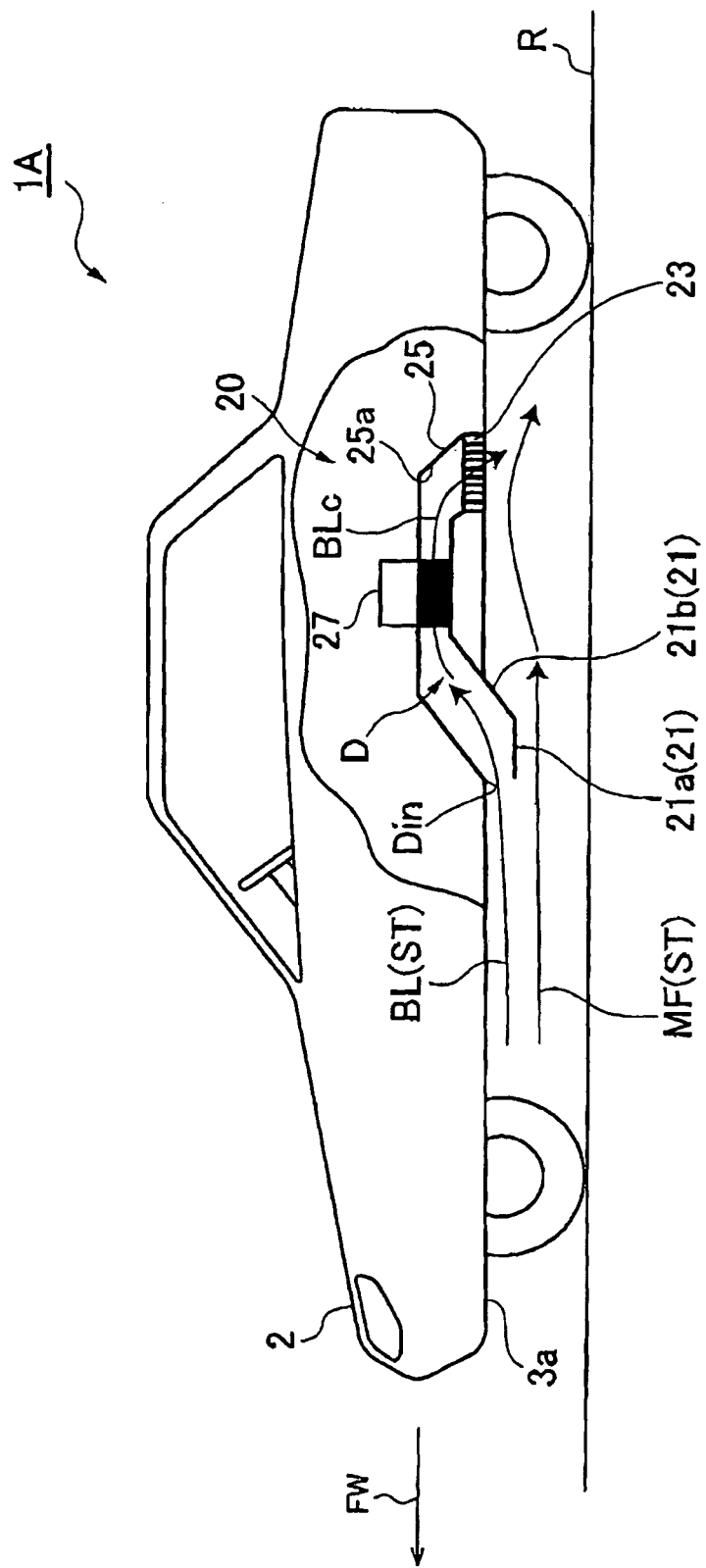
FIG. 4 is a schematic block diagram of a moving body in which a fluid control apparatus in accordance with a second embodiment is installed.

FIG. 4 is a schematic configuration diagram of a moving body in which a fluid control apparatus in accordance with a second embodiment of the present invention is installed. As shown in FIG. 4, the fluid control apparatus 20 is an apparatus installed in a moving body 1A. Further, the fluid control apparatus 20 is an apparatus for separating the air stream ST generated around the moving body 1A due to movement of the moving body 1A into the main flow MF and the boundary layer BL. The fluid control apparatus 20 is provided on the lower surface 3a (surface) of the body 2 of the moving body 1A such as a vehicle. The fluid control apparatus 20 includes a boundary layer separation portion 21, the duct D, a compression portion 27, and a blow-out portion 23. In the descriptions made hereinafter, up and down, front and rear, and left and right of the fluid control apparatus 20 represent the directions in the case that the body 2 side is up, the road surface R side is down, the traveling direction FW side is front, and the opposite side to the traveling direction FW is rear. Further, the flow velocities of the main flow MF and the boundary layer BL represent the relative speeds to the moving body 1A.

The boundary layer separation portion 21 has a structure for separating the air stream ST into the boundary layer BL and the main flow MF. Specifically, the boundary layer separation portion 21 includes a boundary layer separation plate 21a and a support member 21b, for example. The boundary layer separation plate 21a is a plate member for separating the air stream ST into the boundary layer BL and the main flow MF. The boundary layer separation plate 21a is provided at a prescribed interval from the lower surface 3a in order to be positioned in a position around the boundary between the boundary layer BL and the main flow MF of the air stream ST on the lower surface 3a. Further, the boundary layer separation plate 21a is provided in parallel with the lower surface 3a. The boundary layer separation plate 21a has approximately the same width as the width of the lower surface 3a in the left-right direction, for example. Here, being in parallel with the lower surface 3a includes being generally in parallel therewith to the extent that boundary layer separtion plate 21a can mechanically separate the boundary layer BL from the main flow MF and is almost not subject to the resistance due to the air stream ST generated around the moving body 1A.

The support member 21b is a member for mounting the boundary layer separation plate 21a on the lower surface 3a. The support member 21b connects a rear end of the boundary layer separation plate 21a and the lower surface 3a together along the left-right direction of the boundary layer separation plate 21a. A front edge of the boundary layer separation plate 21a and the lower surface 3a form the opening Din which opens forward. The opening Din is a suction opening for suctioning the boundary layer BL separated by the boundary layer separation plate 21a. The duct D is a conduit for carrying the boundary layer BL separated by the boundary layer separation plate 21a to the blow-out portion 23 and is provided in the body 2.

The compression portion 27 is a portion for compressing the boundary layer BL separated by the boundary layer separation plate 21a. The compression portion 27 is provided on a route of the duct D, compresses the boundary layer BL passing through the duct D, forms a boundary layer BLc at higher pressure than the boundary layer BL and the main flow MF, and delivers the boundary layer BLc to the blow-out portion 23.

The blow-out portion 23 is a portion for blowing out the boundary layer BLc compressed by the compression portion 27 into the main flow MF separated by the boundary layer separation portion 21 in the rear of the boundary layer separation portion 21. The blow-out portion 23 is provided along the lower surface 3a, for example. Further, the blow-out portion 23 has approximately the same width as the width of the lower surface 3a in the left-right direction. Moreover, a plurality of blow-out holes are formed in the blow-out portion 23. The boundary layer BLc which has compressed by the compression portion 27 is blown out from the lower surface 3a toward the road surface R via the blow-out holes. Here, the main flow MF has a property of reattaching to the body (the lower surface 3a) in the downstream. Therefore, the blow-out portion 23 blows out the boundary layer BLc compressed by the compression portion 27, for example, around a position in which the main flow MF separated by the boundary layer separation portion 21 starts reattaching to the lower surface 3a.

The fluid control apparatus 20 may further include a guide portion 25. Since the guide portion 25 is the same as the guide portion 15 of the fluid control apparatus 10, descriptions thereof will be omitted.

The air stream around the moving body 1A including the fluid control apparatus 20 configured in such a manner will be described. The moving body 1A moves in the traveling direction FW, and the air stream ST in which the main flow MF and the boundary layer BL are integrally formed is thereby generated from the front toward the rear of the moving body 1A. The air stream ST is mechanically separated into the main flow MF and the boundary layer BL by the front edge of the boundary layer separation plate 21a of the boundary layer separation portion 21. In this process, the separated boundary layer BL flows into the duct D through the opening Din and is compressed by the compression portion 27 to form the boundary layer BLc at high pressure.

The flow direction of the boundary layer BLc at high pressure is changed by the guide portion 25 into a direction from the lower surface 3a toward the road surface R. On the other hand, the separated main flow MF flows rearward from the front edge of the boundary layer separation plate 21a. The main flow MF starts reattaching to the lower surface 3a as progressing rearward. The boundary layer BLc at high pressure whose flow direction has been changed is blown out into the separated main flow MF by the blow-out portion 23. This changes the flow direction of the main flow MF into the direction departing from the lower surface 3a.

As described above, the fluid control apparatus 20 includes the compression portion 27. The boundary layer BL is thereby compressed to form the boundary layer BLc at high pressure. Accordingly, the fluid velocity of the boundary layer BLc blown out from blown out portion 23 can be increased. Therefore, compared to the fluid control apparatus 10, the fluid control apparatus 20 can change the direction of the main flow MF into a direction further separating from the lower surface 3a, and the reattachment of the main flow MF to the body 2 can further be prevented.

The fluid control apparatus in accordance with the present invention is not limited to the apparatus described in the first and second embodiments. For example, the fluid control apparatUs 10 and 20 can be installed in various moving bodies 1 and 1A such as air planes, not limited to vehicles. Further, the fluid control apparatus 10 or 20 can be provided on a surface of the body 2 of the moving body 1 or 1A, not limited to the lower surface 3a of the body 2 of the moving body 1 or 1A. Further, in the first and second embodiments, the widths of the boundary layer separation plates 11a and 21a and the blow-out portions 13 and 23 are approximately the same as the width of the lower surface 3a. However, their widths may be narrower than the width of the lower surface 3a and are appropriately adjusted according to necessity.

Further, in the first and second embodiments, the guide portions 15 and 25 are the plate members having the respective guide surfaces 15a and 25a inclined rearward as departed downward from the lower surface 3a. However, they are not limited to those. It is sufficient that the guide portion 15 can change the flow direction of the boundary layer BL separated by the boundary layer separation plate 11a into a direction from the lower surface 3a toward the road surface R. It is sufficient that the guide portion 25 can change the flow direction of the boundary layer BLc compressed by the compression portion 27 into a direction from the lower surface 3a toward the road surface R.

Further, in the first and second embodiments, the blow-out portion 13 and 23 are provided in preset positions. However, they are not limited to such positions. The state of the main flow MF is detected, the position to which the main flow MF reattaches is estimated, and the positions of the blow-out portion 13 and 23 may thereby be adjusted.

Further, in the first and second embodiments, the boundary layer separation plate 11a and 21a are provided at preset intervals from the lower surface 3a. However, they are not limited to such a manner. For example, the fluid control apparatus 10 or 20 can further include means for detecting the moving speed of the moving body 1 or 1A, means for estimating a boundary position between the boundary layer BL and the main flow MF in response to the detected moving speed, and means for adjusting the interval between the boundary layer separation plate 11a or 21a and the lower surface 3a to the boundary position between the boundary layer BL and main flow MF. In such a case, in response to the moving speed of the moving body 1 or 1A, the boundary layer separation plate 11a or 21a can be provided in the boundary position between the boundary layer BL and the main flow MF.

Further, in the first and second embodiments, the fluid control apparatus 10 and 20 control the air stream ST around the respective moving body 1 and 1A. However, in a case that a fluid other than the air is present around the moving body 1 or 1A, the flow of the fluid can be controlled in the same manner. On the surfaces of the bodies 2 of the moving bodies 1 and 1A, in the boundary layer of fluid flows, sheering force due to viscosity causes resistance to the fluid flow on the moving bodies 1 and 1A, thereby decelerating the moving bodies 1 and 1A. Therefore, on the surfaces of the moving bodies 1 and 1A, the fluid flow is separated into the boundary layer and the main flow, the separated boundary layer is blown out into the separated main flow, and the main flow can thereby be prevented from reattaching to the bodies 2. Accordingly, deceleration of the main flow can be prevented, thereby enabling reduction in the resistance due to the fluid flow. As a result, fuel efficiency and so forth can be improved.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A fluid control apparatus comprising:
   a plate member that separates an air stream on a surface of a body of a moving body into a boundary layer and a main flow; and
   a blow-out portion that blows out the boundary layer separated by the plate member into the main flow separated from the boundary layer by the plate member in a downstream of the plate member in a flow direction of the air stream,
   wherein the blow-out portion is provided rearward at a rear end of the plate member in parallel with the plate member.

2. The fluid control apparatus according to claim 1,
   wherein the plate member is provided at a certain interval from the surface of the body.

3. The fluid control apparatus according to claim 1, further comprising
   a guide portion that changes a flow direction of the separated boundary layer,
   wherein the blow-out portion blows out the boundary layer whose flow direction is changed by the guide portion into the separated main flow.

4. The fluid control apparatus according to claim 3,
   wherein the guide portion changes the flow direction of the separated boundary layer into a direction separating from the surface of the body.

5. The fluid control apparatus according to claim 1, further comprising
   a compression portion that compresses the separated boundary layer,
   wherein the blow-out portion blows out the boundary layer compressed by the compression portion into the separated main flow.

6. The fluid control apparatus according to claim 1, wherein
   a plurality of blow-out holes are formed in the blow-out portion.

* * * * *